April 1, 1958   C. W. NELEMS   2,828,686
COOKING APPARATUS FOR ELONGATED FOOD ITEMS
Filed June 27, 1956
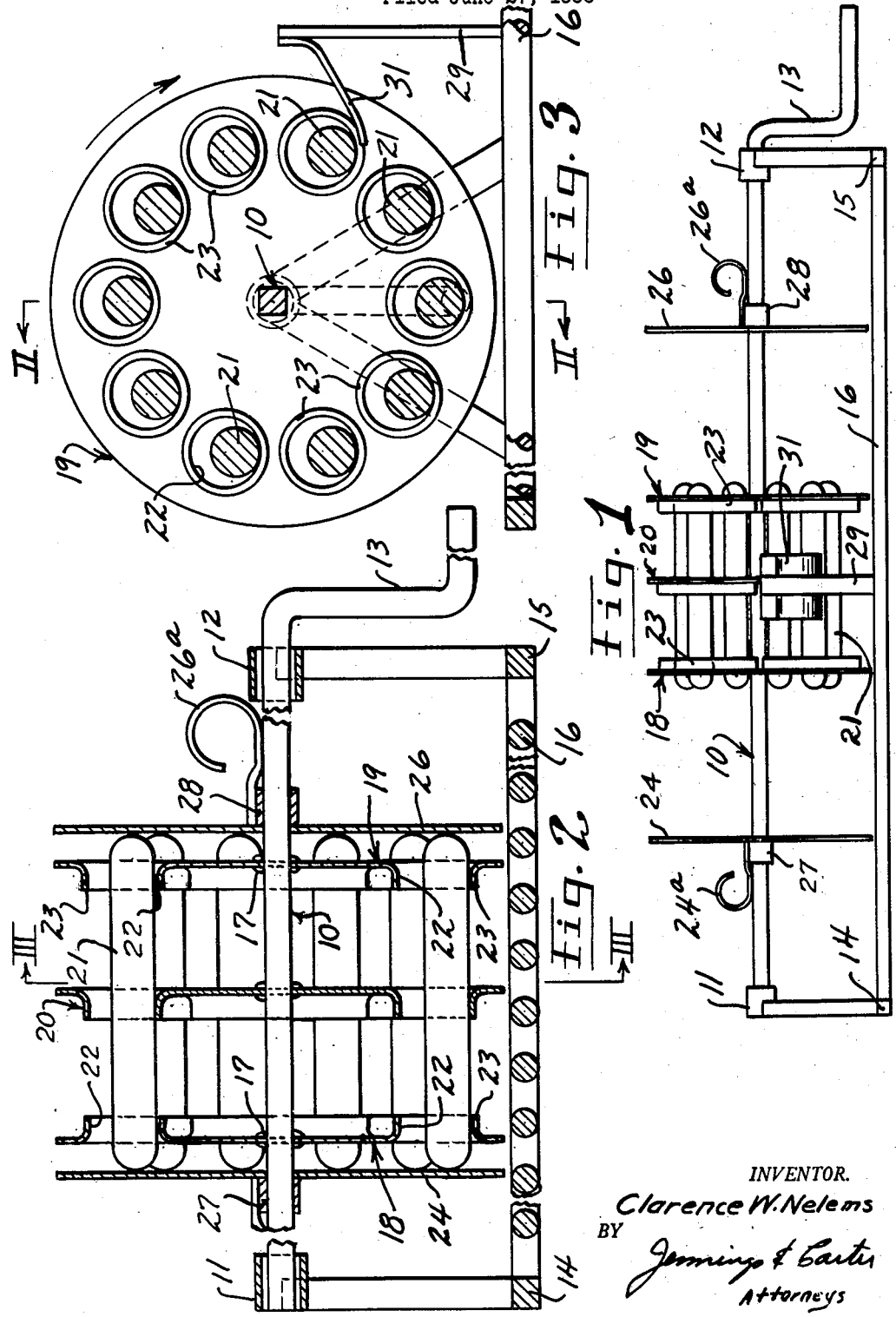
INVENTOR.
Clarence W. Nelems
BY
Jennings & Carter
Attorneys

United States Patent Office

2,828,686
Patented Apr. 1, 1958

2,828,686

COOKING APPARATUS FOR ELONGATED FOOD ITEMS

Clarence W. Nelems, Brea, Calif.

Application June 27, 1956, Serial No. 594,143

4 Claims. (Cl. 99—427)

My invention relates to apparatus for cooking elongated food items such as weiners or the like and has for an object the provision of apparatus of the character designated which shall be effective to hold a plurality of such food items so that they may be rotated over an open fire or other source of heat, thus to cook them.

Another object of my invention is to provide apparatus for cooking a plurality of items such as weiners which embodies a rotatable shaft carrying a pair of generally vertically disposed, spaced holders for the weiners, the holders having openings therein together with means for preventing the weiners from moving axially relative to the supporting members and in which said means may be withdrawn to permit loading or unloading of the apparatus.

A more specific object is to provide a device embodying the features indicated in which the supporting members for the weiners may be plates which may have holes therein to receive the weiners and may have die formed therein, around the holes, inturned, horizontally disposed annular rings which give bearing support for the weiners, permitting the plates to be of thin material and yet assuring that the weiners are not cut as the apparatus rotates.

A more specific object is to provide a device of the character designated in which the means to hold the food items against axial movement comprises a pair of plate-like members non-rotatably and slidably mounted on the shaft for movement toward and from the outer ends of the weiners in the apparatus whereby with a simple sliding movement of the members just mentioned the apparatus may be loaded or unloaded.

Another object is to provide means for rotating the weiners about their longitudinal axes as the entire apparatus rotates, this means consisting essentially of a stationary member positioned to be engaged by the weiners as the apparatus rotates, thus to lift them and slightly turn them, to present all of the surface of each weiner to the source of heat.

Briefly, my invention comprises a shaft mounted for rotation in suitable manner over a source of heat which may be the usual barbecue brazier. Non-rotatably mounted on the shaft are a pair of generally vertically disposed weiner holding members having therein aligned openings to receive the weiners. Slidably mounted on the shaft, which preferably is square in cross section, are members which may be brought close to the outer surfaces of the holders, thereby to prevent the weiners from shifting in the holders. Mounted in suitable manner alongside the apparatus in position to engage partially beneath the weiners as they rotate is a member for turning them partially about their own axes. Thus, as the entire apparatus rotates the weiners are moved over the fire and rotated about their axes thus thoroughly to cook them.

Apparatus illustrating features of my invention is shown in the accompanying drawings forming a part of this application in which:

Fig. 1 is a front elevational view showing the apparatus loaded with elongated food items and ready for the securing plate-like members to be slid into place;

Fig. 2 is an enlarged, fragmental detail sectional view, partly broken away, and taken generally along line II—II of Fig. 3; and, Fig. 3 is a detail fragmental sectional view taken generally along line III—III of Fig. 2.

Referring now to the drawings for a better understanding of my invention it will be seen that my improved apparatus comprises an elongated, horizontal shaft indicated generally by the numeral 10 and which preferably is square in cross section. The shaft 10 may be supported in bearings 11 and 12 and may have a handle 13 at one end by which it may be rotated. The bearings 11 and 12 may be supported in suitable manner on members 14 and 15. The members may be supported on top of a hearth, or a grill indicated by the numeral 16 and beneath which may be an open fire not shown, or other source of heat.

Mounted in spaced relation to each other and secured to the shaft as by welding at 17 are weiner supporting members 18 and 19. It will be noted that the members 18 and 19 are generally vertically disposed and, as stated, are non-rotatably mounted on the shaft 10. Likewise, the members are spaced apart less than the length of the food item to be cooked which is indicated in the drawings as being a weiner or the like 21. If desired an intermediate supporting member 20, similar to members 19 and 21, may be used to give added support to the food item.

Each of the members 18 and 19 is provided with a plurality of holes 22, which are round and which are larger in diameter than the diameter of the food item 21. Die formed or otherwise provided around the peripheries of the holes 22 are inturned annular supporting rings 23 which provide a good bearing surface for the food items, permitting the plates 18 and 19 to be of very thin material without danger of cutting the food items.

Slidably mounted on the shaft 10, outwardly of members 18 and 19 are plate-like members 24 and 26. These members may carry bosses 27 and 28 which fit non-rotatably and slidably on the shaft 10. Carried by the bosses and in frictional engagement with the shaft 10 are rings 24a and 26a, respectively, which frictionally secure the members 24 and 26 in selected axial positions on the shaft.

Mounted in suitable manner on a part of the grill 16 is a vertically upstanding member 29. Projecting inwardly of member 29 is a curved plate 31 having an outer end which underlies the path of the food products as the entire apparatus rotates. The lower outer end of the member 31 is so positioned that as the food products pass the same each one is slightly lifted and slightly rotated about its own axis.

From the foregoing the method of constructing and using my improved apparatus together with the advantages thereof may now be readily understood. With the apparatus constructed as shown in the drawings it will be apparent that by pulling on the rings 24a and 26a the members 24 and 26 may be moved along the shaft, providing ample room for the insertion of the food products 21 into the openings 22. When all of the openings are filled the plates 24 and 26 may now be moved up very closely to but preferably not actually in contact with the ends of the food items 21. The handle 13 now is rotated bringing the food items successively down close to the grill 16. It will be understood that the rotation of the apparatus is in a direction to bring the food items down onto the lifting and turning member 31, that is, clockwise as viewed in Fig. 3. When it is desired to unload the device either one or both of the plates 24 or 26 may be slid along the shaft 10, hooks 24a and 26a serving the dual purpose of providing a means for grasping the plates with a suitable tool or by hand and also frictionally securing the plates on the shaft 10, in axially selected positions there along.

From the foregoing it will be apparent that I have devised an improved, simplified and effective apparatus for cooking elongated food products such as weiners and the like. The device may be made large enough to accommode any number of weiners desired and instead of rotating the device by hand it will be apparent that it may be motor driven.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In apparatus for cooking elongated food items such as weiners, a horizontally disposed rotatable shaft, a pair of generally vertically disposed members mounted fixedly on the shaft and spaced apart less than the length of said food items, there being axially aligned openings in said members to receive the food items and support them generally in horizontal position, and means slidably mounted on the shaft outwardly of said members for holding the food items against substantial axial movement relative to said members.

2. In cooking apparatus for elongated articles such as weiners, a horizontal shaft supported for rotation, a pair of plate-like members mounted at right angles to the axis of the shaft and fast thereon, there being a plurality of axially aligned substantially circular openings in the plate-like members for receiving the food items and supporting them in horizontal position as the apparatus rotates, there being annular supporting rings around the peripheries of the openings and forming surfaces for supporting the food items, a pair of plate-like members non-rotatably and slidably mounted on the shaft and disposed to be positioned substantially against the ends of the food items in the apparatus, thereby to prevent them from moving axially in the openings, and friction means to secure the latter named plate-like members in selected positions on the shaft.

3. Apparatus as defined in claim 4 in which there are ring-like members carried by the last named plate-like members by which said plate-like members may be moved axially along the shaft.

4. In apparatus for cooking elongated food items such as weiners, a horizontally disposed rotatable shaft, a pair of generally vertically disposed members on the shaft, there being aligned food product receiving openings in said members, means located outwardly of said members for holding the weiners against substantial axial movement in said openings, and stationary means disposed in the path of the moving food items and effective at least partially to rotate them about their axes as the apparatus rotates.

References Cited in the file of this patent

UNITED STATES PATENTS

| | | |
|---|---|---|
| 2,506,931 | Lopes | May 9, 1950 |
| 2,579,827 | Johnson | Dec. 25, 1951 |